(12) United States Patent
Shimazaki et al.

(10) Patent No.: US 11,183,728 B2
(45) Date of Patent: Nov. 23, 2021

(54) BATTERY PACK OF ELECTRIC VEHICLE

(71) Applicant: HONDA MOTOR CO., LTD., Tokyo (JP)

(72) Inventors: Itsuki Shimazaki, Wako (JP); Yohei Azuma, Wako (JP); Shoshi Hidaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/554,620

(22) Filed: Aug. 29, 2019

(65) Prior Publication Data

US 2020/0075907 A1 Mar. 5, 2020

(30) Foreign Application Priority Data

Aug. 31, 2018 (JP) .............................. JP2018-163117

(51) Int. Cl.
*H01M 2/10* (2006.01)
*B60L 50/64* (2019.01)
(Continued)

(52) U.S. Cl.
CPC ............. *H01M 50/20* (2021.01); *B60L 50/64* (2019.02); *B60K 1/04* (2013.01); *B60K 6/28* (2013.01);
(Continued)

(58) Field of Classification Search
CPC .... B60K 1/04; B60K 2001/0438; B60K 6/28; B60L 3/0007; B60L 3/0069; B60L 50/64;
(Continued)

(56) References Cited

U.S. PATENT DOCUMENTS

| 2011/0155485 A1* | 6/2011 | Tsurumi | ................ | H01M 50/10 |
| | | | | 180/65.1 |
| 2013/0130073 A1* | 5/2013 | Kim | ...................... | H01M 50/20 |
| | | | | 429/61 |

(Continued)

FOREIGN PATENT DOCUMENTS

| DE | 102013011894 | 1/2015 |
| DE | 102013018416 | 5/2015 |

(Continued)

OTHER PUBLICATIONS

Japanese Office Action for corresponding JP Application No. 2018-163117, dated Jan. 22, 2020 (w/ English machine translation).

(Continued)

*Primary Examiner* — Lingwen R Zeng
(74) *Attorney, Agent, or Firm* — Mori & Ward, LLP

(57) ABSTRACT

A battery case of an electric vehicle includes a drain hole for discharging water in the interior to the outside and a water detection device disposed in the vicinity of the drain hole. At least part of an upper face of a case bottom wall of the battery case is inclined downward toward the drain hole. Accordingly, not only is it possible to mold the downward inclination of the upper face of the case bottom wall of the battery case easily at the time of die casting without increasing the number of components, but it is also possible to guide water that has entered the interior of the battery case smoothly toward the drain hole, detect it reliably by the water detection device, and discharge it quickly via the drain hole.

7 Claims, 7 Drawing Sheets

(51) Int. Cl.
  *H01M 50/20* (2021.01)
  *B60K 6/28* (2007.10)
  *B60K 1/04* (2019.01)
  *B60L 3/00* (2019.01)
  *H01M 50/691* (2021.01)
  *H01M 10/48* (2006.01)
  *H01M 50/24* (2021.01)
  *B60L 50/60* (2019.01)

(52) U.S. Cl.
  CPC ..... *B60K 2001/0438* (2013.01); *B60L 3/0007* (2013.01); *B60L 3/0069* (2013.01); *B60L 50/66* (2019.02); *B60Y 2200/91* (2013.01); *B60Y 2200/92* (2013.01); *B60Y 2400/112* (2013.01); *H01M 10/48* (2013.01); *H01M 50/24* (2021.01); *H01M 50/691* (2021.01); *H01M 2220/20* (2013.01); *Y02E 60/10* (2013.01); *Y02T 10/70* (2013.01)

(58) Field of Classification Search
  CPC . B60L 50/66; B60Y 2200/91; B60Y 2200/92; B60Y 2400/112; H01M 10/48; H01M 2220/20; H01M 50/20; H01M 50/24; H01M 50/691; Y02E 60/10; Y02T 10/70
  See application file for complete search history.

(56) References Cited

U.S. PATENT DOCUMENTS

| 2015/0236314 | A1  | 8/2015 | Lee et al. | |
| 2016/0093870 | A1* | 3/2016 | DeKeuster | H01M 50/691 |
| | | | | 429/89 |
| 2016/0156080 | A1  | 6/2016 | Enning et al. | |
| 2017/0259693 | A1* | 9/2017 | Kirk | H01M 10/625 |
| 2018/0269703 | A1* | 9/2018 | Nook | H01M 50/543 |

FOREIGN PATENT DOCUMENTS

| EP | 2749444 | 7/2014 |
| JP | 2011-173447 | 9/2011 |
| JP | 2011-195069 | 10/2011 |
| JP | 2015-079605 | 4/2015 |
| WO | WO 2013/080567 | 6/2013 |

OTHER PUBLICATIONS

German Search report issued by the German Patent and Trademark Office for corresponding DE Application No. 102019211899.2, dated Apr. 27, 2020.

Japanese Office Actiton issued by the Japan Patent Office for corresponding JP Application No. 2018-163117, dated Jul. 15, 2020 (w/ English machine translation).

* cited by examiner

BATTERY PACK OF ELECTRIC VEHICLE

BACKGROUND OF THE INVENTION

Field of the Invention

The present invention relates to a battery pack of an electric vehicle comprising a plurality of battery modules housed in an interior of a battery case made by metal die-casting.

Japanese Patent Application Laid-open No. 2011-195069 has made known an arrangement in which a recess portion formed in a bottom wall of a battery case is provided with a water sensor and a drain port that is opened and closed by an open/close valve, and when the water sensor detects the entry of water into the interior of the battery case the drain port is opened by the open/close valve to thus discharge water outside the battery case.

Description of the Related Art

In the above conventional arrangement, since the battery case is formed by press forming a steel sheet, if an attempt is made to impart to the battery case a shape for guiding water to the drain port or the water sensor, the number of components increases and the structure of a press forming mold becomes complicated, thus giving rise to a possibility that the cost will increase.

SUMMARY OF THE INVENTION

The present invention has been accomplished in light of the above circumstances, and it is an object thereof to enable a battery case having water detection and water discharge functions to be formed simply without increasing the number of components.

In order to achieve the object, according to a first aspect of the present invention, there is provided a battery pack of an electric vehicle comprising a plurality of battery modules housed in an interior of a battery case made by metal die-casting, wherein the battery case comprises a drain hole for discharging water in its interior to an outside and a water detection device disposed in a vicinity of the drain hole, and at least part of an upper face of a case bottom wall of the battery case is inclined downward in going toward the drain hole.

In accordance with the first aspect, the battery pack of the electric vehicle houses the plurality of battery modules in the interior of the battery case made by metal die-casting. Since the battery case includes the drain hole for discharging water in the interior to the outside and the water detection device disposed in the vicinity of the drain hole, and at least part of the upper face of the case bottom wall of the battery case is inclined downward toward the drain hole, not only is it possible to mold the downward inclination of the upper face of the case bottom wall of the battery case easily at the time of die casting without increasing the number of components, but it is also possible to guide water that has entered the interior of the battery case smoothly toward the drain hole, detect it reliably by the water detection device, and discharge it quickly via the drain hole.

According to a second aspect of the present invention, there is provided a battery pack of an electric vehicle comprising a plurality of battery modules housed in an interior of a battery case made by metal die-casting, wherein the battery case comprises a drain hole discharging water in its interior to an outside and a water detection device disposed in a vicinity of the drain hole, and the drain hole is provided in a downwardly recessed recess portion formed in an upper face of a case bottom wall of the battery case.

In accordance with the second aspect, the battery pack of the electric vehicle houses the plurality of battery modules in the interior of the battery case made by metal die-casting. Since the battery case includes the drain hole for discharging water in the interior to the outside and the water detection device disposed in the vicinity of the drain hole, and the drain hole is provided in the recess portion formed in the upper face of the case bottom wall of the battery case and recessed downward, not only is it possible to mold the recess portion in the upper face of the case bottom wall of the battery case easily at the time of die casting without increasing the number of components, but it is also possible to guide water that has entered the interior of the battery case smoothly toward the recess portion, detect it reliably by the water detection device, and discharge it quickly via the drain hole.

According to a third aspect of the present invention, in addition to the first aspect, the interior of the battery case is divided into two battery chambers by a beam portion formed integrally with the battery case, and the drain hole and the water detection device are provided in each of the battery chambers.

In accordance with the third aspect, since the interior of the battery case is divided into two battery chambers by the beam portion, which is formed integrally therewith, and each battery chamber is provided with the drain hole and the water detection device, it is possible to carry out detection of the entry of water and discharge of water in both of the two battery chambers without problems.

According to a fourth aspect of the present invention, in addition to the third aspect, the beam portion extends in a vehicle width direction, and the drain hole and the water detection device are disposed in a middle part in the vehicle width direction of the battery case.

In accordance with the fourth aspect, since the beam portion extends in the vehicle width direction and the drain hole and the water detection device are disposed in the middle part in the vehicle width direction of the battery case, it is possible, by gathering, from opposite sides in the vehicle width direction to the middle part in the vehicle width direction, water that has built up on the upper face of the case bottom wall of the battery case while enhancing the side collision resistance performance of the battery pack by the beam portion, to detect the entry of water more reliably and discharge water more smoothly.

According to a fifth aspect of the present invention, in addition to the first aspect, the battery case comprises a water jacket formed between the battery case and a lid member fixed to a lower face of the case bottom wall, and the drain hole is disposed at a position where the drain hole does not overlap the water jacket when viewed from above.

In accordance with the fifth aspect, since the battery case includes the water jacket formed between the battery case and the lid member fixed to the lower face of the case bottom wall, and the drain hole is disposed at a position where it does not overlap the water jacket when viewed from above, the drain hole can be easily formed without interfering with the water jacket.

According to a sixth aspect of the present invention, in addition to the fifth aspect, the battery case comprises a groove portion formed in an upper face of the case bottom wall, the groove portion being recessed downward along part of a periphery of the water jacket, and the groove portion extends toward the drain hole.

In accordance with the sixth aspect, since the upper face of the case bottom wall of the battery case includes the groove portion recessed downward along part of the periphery of the water jacket, and the groove portion extends toward the drain hole, it is possible to guide along the groove portion water that has built up on the upper face of the case bottom wall of the battery case and discharge it from the drain hole more smoothly.

According to a seventh aspect of the present invention, in addition to the first aspect, an electrical power line extending from the plurality of battery modules is disposed in a fore-and-aft direction in a space formed between the battery modules on left and right in the middle part in the vehicle width direction of the battery case, and a connecting wire connecting the water detection device to an electrical component is bundled with the electrical power line in the space.

In accordance with the seventh aspect, since the electrical power line extending from the plurality of battery modules is disposed in the fore-and-aft direction in the space formed between the battery modules on left and right in the middle part in the vehicle width direction of the battery case, and the connecting wire connecting the water detection device to the electrical component is bundled with the electrical power line in the space, it is possible to dispose the electrical power line and the connecting wire in a compact manner by utilizing effectively the space between the left and right battery modules.

Note that a cross member 31e of an embodiment corresponds to the beam portion of the present invention, a front battery chamber 31f and a rear battery chamber 31g of the embodiment correspond to the battery chambers of the present invention, and a ground fault detection connector 37 of the embodiment corresponds to the water detection device of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to FIG. 1 to FIG. 7. In the following description reference numbers corresponding to components of the exemplary embodiment are included only for ease of understanding, but the applicant's claims are not limited to the exemplary embodiment or to specific components of the exemplary embodiment. In the present specification, the fore-and-aft direction, the left-and-right direction (vehicle width direction), and the up-and-down direction are defined with reference to an occupant seated on a driving seat.

Figure 1:
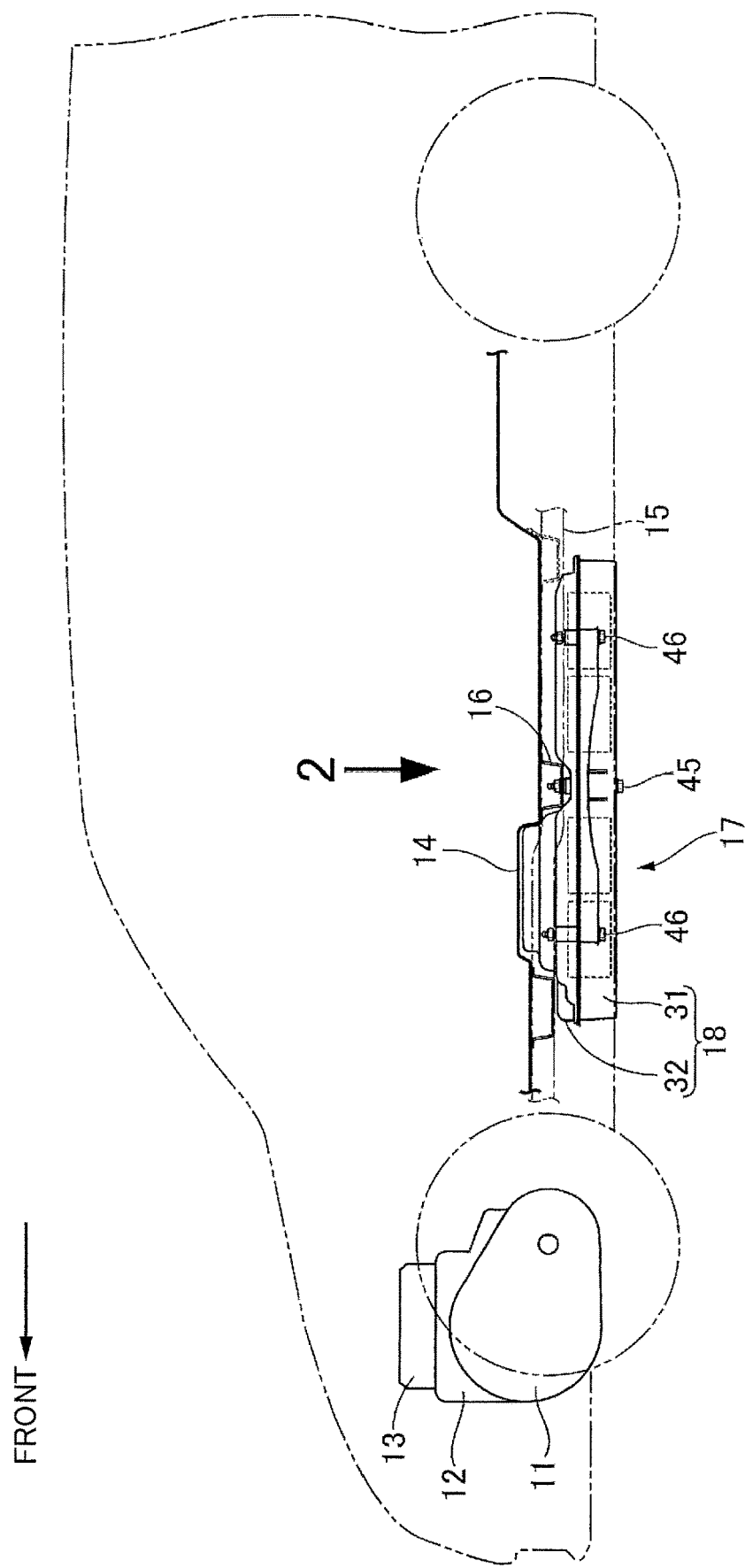
FIG. 1 is a side view of a vehicle body of a plug-in hybrid vehicle.
Figure 2:
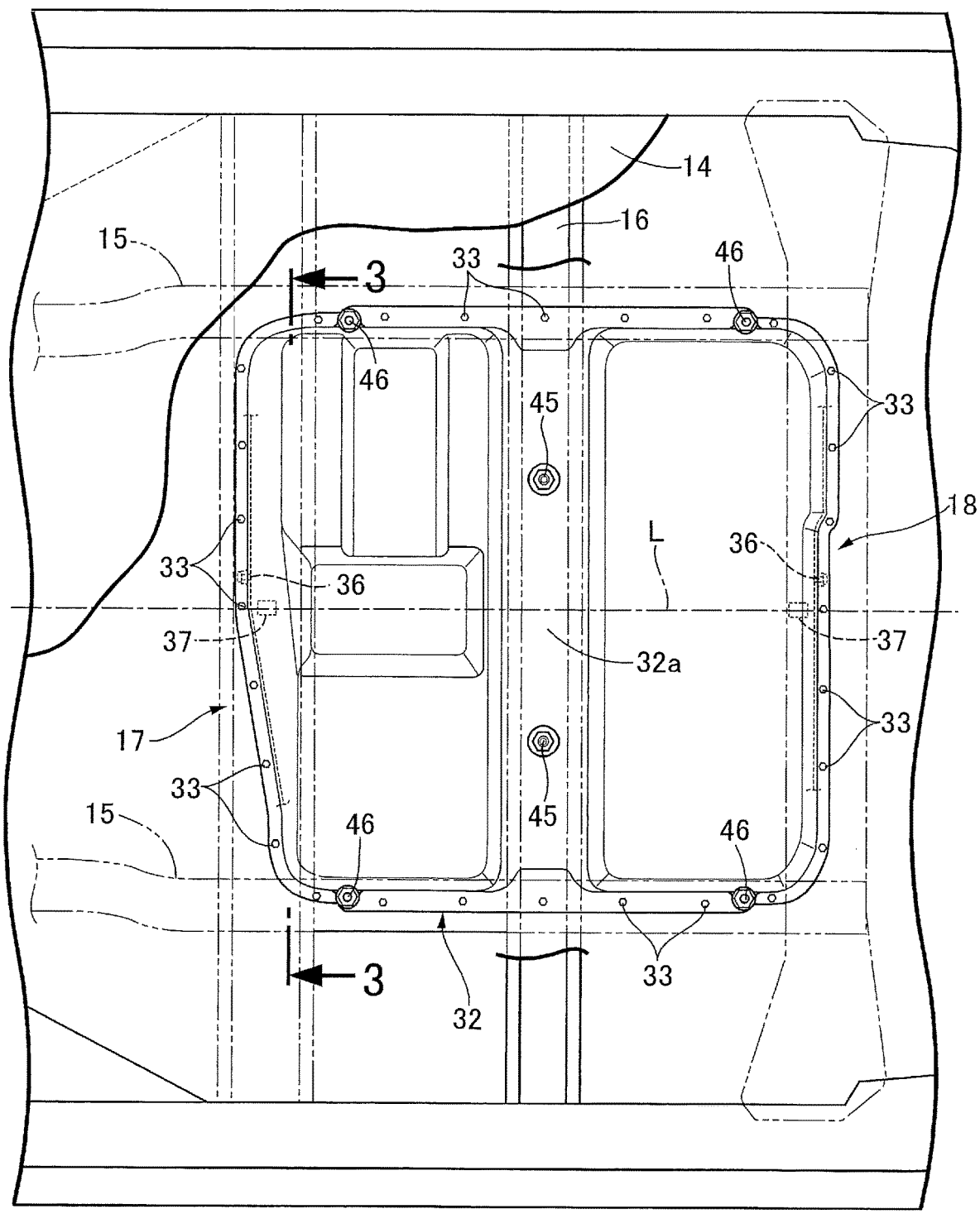
FIG. 2 is a view in the direction of arrow 2 in FIG. 1.

As shown in FIG. 1 and FIG. 2, mounted on a front part of a vehicle body of a front wheel drive plug-in hybrid vehicle are an electric motor 11 for driving a front wheel, an engine 12 for driving a generator charging a battery, and a power drive unit 13 equipped with an inverter for controlling the driving of the electric motor 11. Disposed on a lower face of the floor panel 14 are a pair of left and right floor frames 15 extending in the fore-and-aft direction and a floor cross member 16 connecting the left and right floor frames 15 in the vehicle width direction, and fixed to lower faces of the floor frame 15 and the floor cross member 16 is a battery case 18 forming the outline of a battery pack 17 for supplying power to the electric motor 11.

Figure 7:
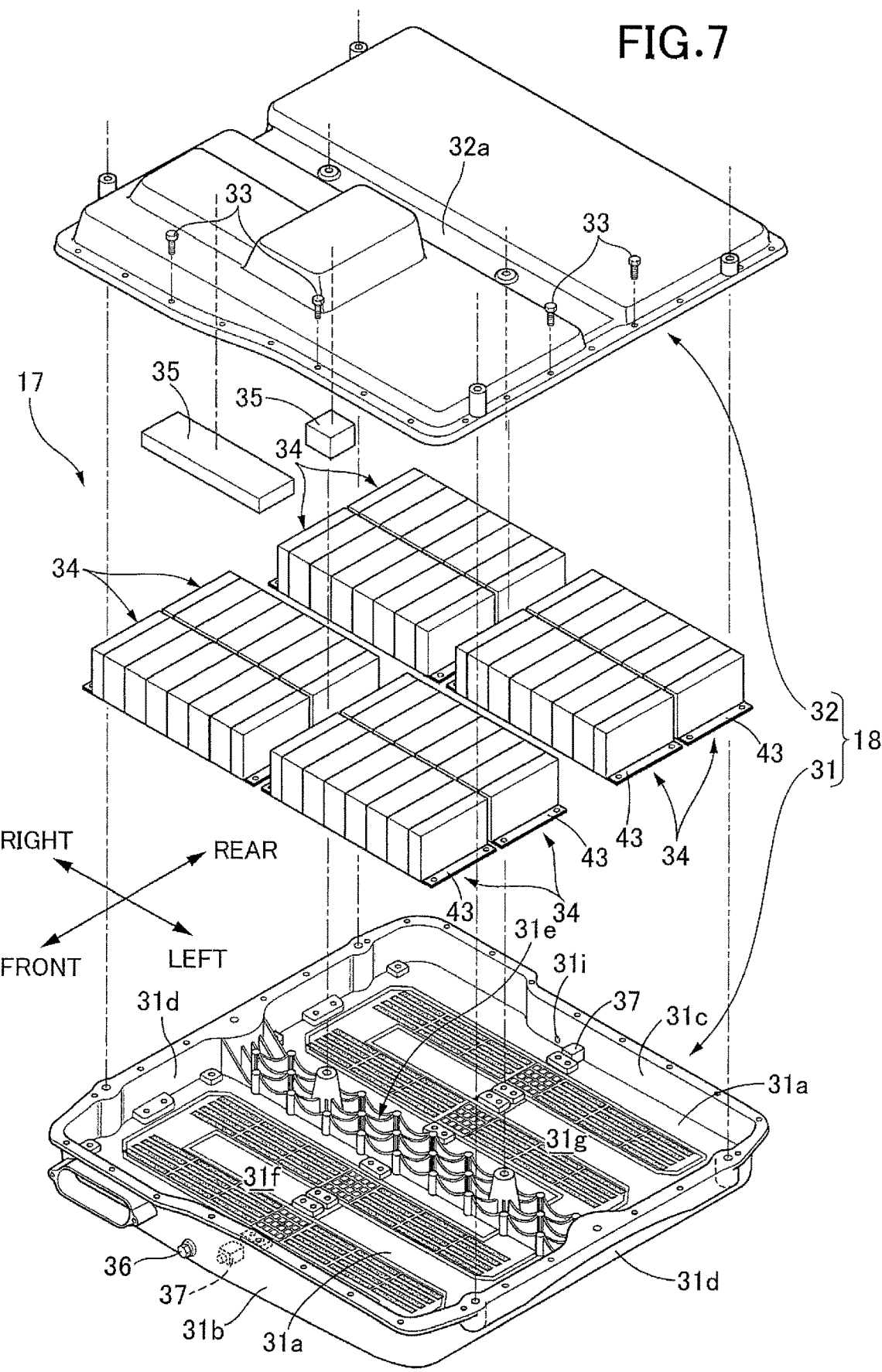
FIG. 7 is an exploded perspective view of a battery pack.

As shown in FIG. 7, the battery case 18 is formed by joining in the up-down direction a case main body 31 made by metal (aluminum) die-casting and opening upward and a cover 32 made by metal (aluminum) die-casting and opening downward via outer peripheral parts thereof by means of a plurality of bolts 33. Eight battery modules 34 are mounted on a bottom part of the case main body 31, and an electrical component 35 such as a battery control device, a junction board, or a cell voltage sensor is disposed above the battery modules 34.

The case main body 31 has a shallow container shape and includes a substantially flat case bottom wall 31a, a case front wall 31b, a case rear wall 31c, and left and right case side walls 31d rising from the outer periphery of the case bottom wall 31a, and a cross member 31e connecting the left and right case side walls 31d in the vehicle width direction. The cross member 31e forming a beam portion of the present invention is an assembly of a large number of ribs rising from the case bottom wall 31a, but any structure may be employed. The interior of the case main body 31 is divided into a front battery chamber 31f and a rear battery chamber 31g by means of the cross member 31e, four battery modules 34 being disposed in the front battery chamber 31f, and four battery modules 34 being disposed in the rear battery chamber 31g.

Figure 3:
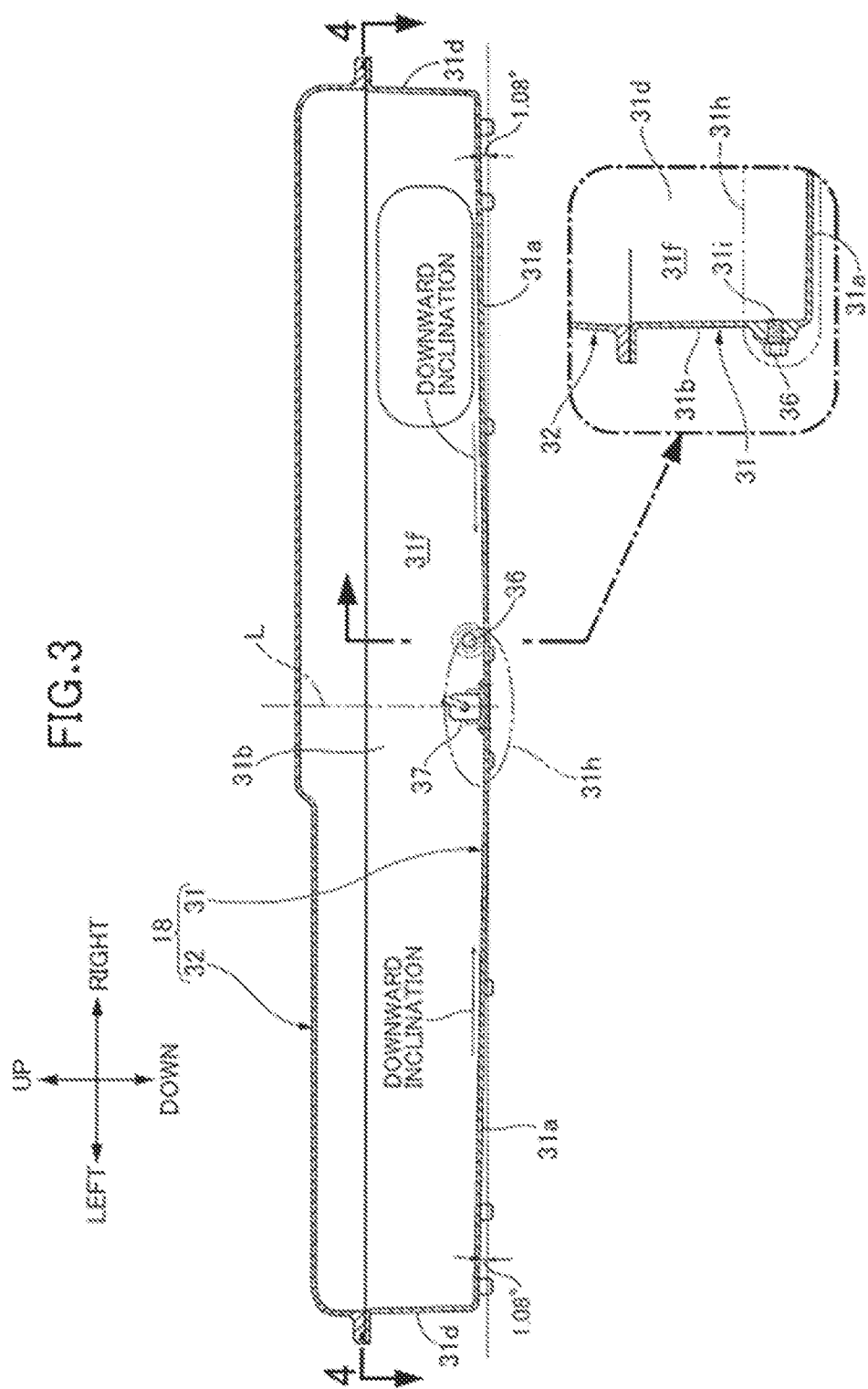
FIG. 3 is a sectional view along line 3-3 in FIG. 2.
Figure 4:
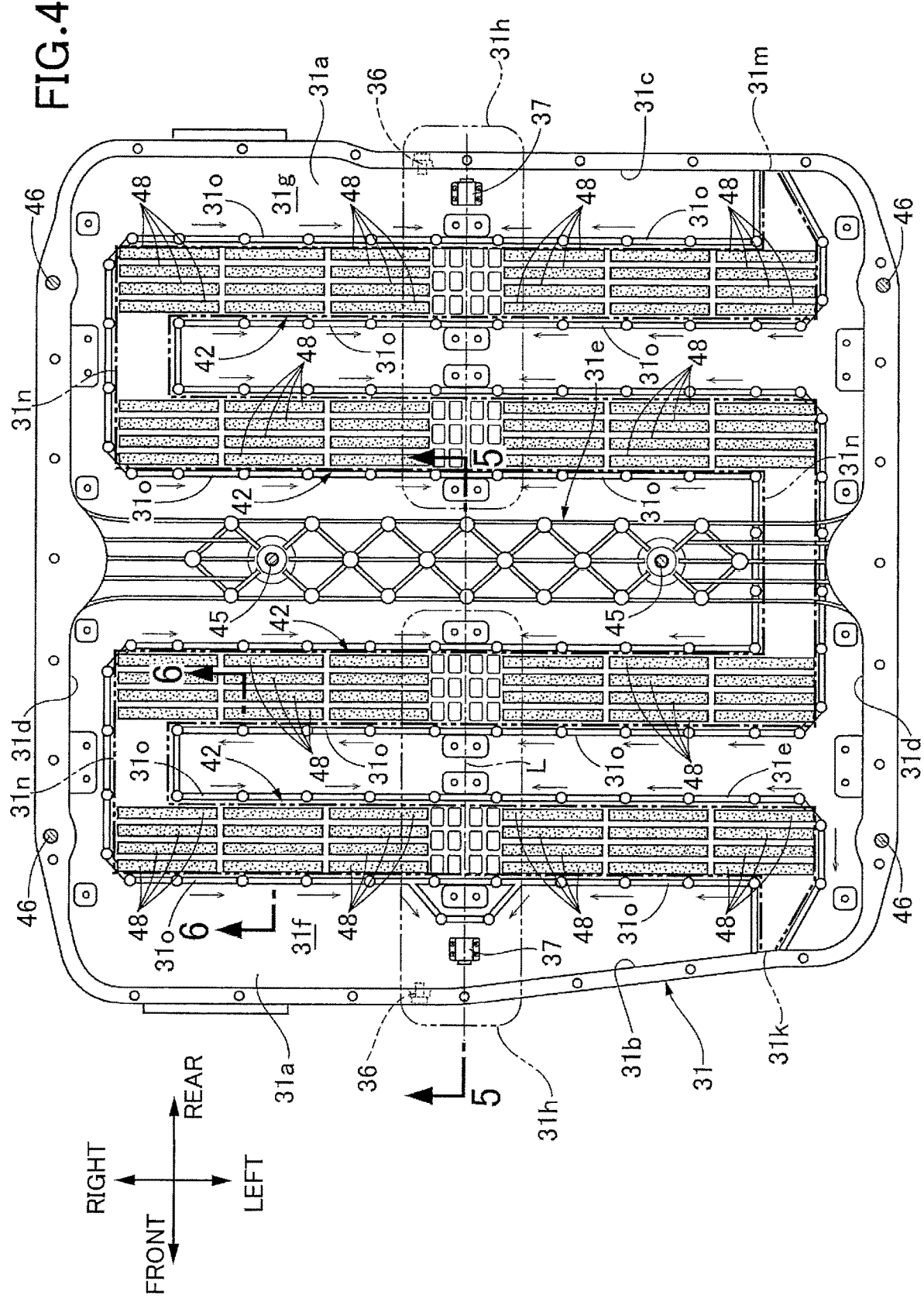
FIG. 4 is a view from arrowed line 4-4 in FIG. 3.

As shown in FIG. 3 and FIG. 4, the left half, with respect to the vehicle body center line L, of the case bottom wall 31a of the case main body 31 is inclined downward to the right, and the right half is inclined downward to the left. That is, the section in the vehicle width direction of the case bottom wall 31a of the case main body 31 is formed into a V shape so that the position of the vehicle body center line L is the lowest (see FIG. 3). The inclination angle of the case bottom wall 31a is a small angle that is necessary for gathering toward the vehicle body center line L side water that has built up on the case bottom wall 31a, and is for example 1.08° in the embodiment. Therefore, the front battery chamber 31f and the rear battery chamber 31g of the case main body 31 each have a recess portion 31h at a position where the case bottom wall 31a is the lowest on the vehicle body center line L.

A drain hole 31i for discharging water that has built up in the front battery chamber 31f and the rear battery chamber 31g is formed in a lower part, facing the recess portion 31h, of each of the case front wall 31b and the case rear wall 31c, and these drain holes 31i are blocked by means of a drain bolt 36. A ground fault detection connector 37 forming the water detection device of the present invention is provided on the case bottom wall 31a in the vicinity of the drain hole 31i.

The ground fault detection connector 37 detects an electrical short circuit (ground fault) between the positive terminal of the battery module 34 and the case main body 31, to which the negative terminal of the battery module 34 is grounded, and issues an alarm. It detects a ground fault by applying a rectangular pulse voltage between a high voltage part and a low voltage part of the battery pack 17 and measuring a change of the impedance based on the amplitude of a return waveform. The reason that the ground fault detection connector 37 can detect the entry of water into the battery case 18 is because a ground fault state is attained when the high voltage part and the low voltage part of the battery pack 17 are electrically connected due to the entry of water.

Figure 5:
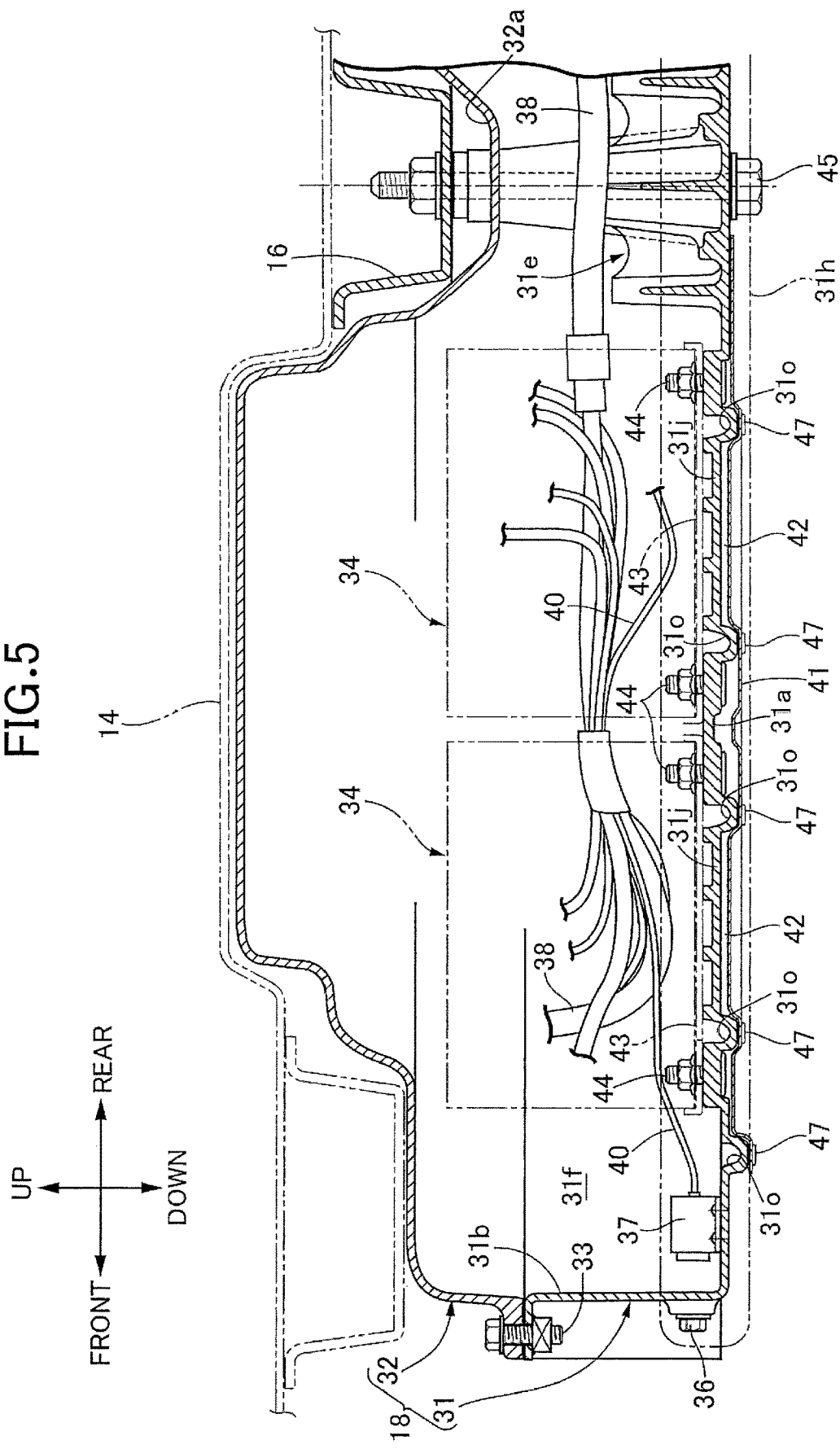
FIG. 5 is a sectional view along line 5-5 in FIG. 4.
Figure 6:
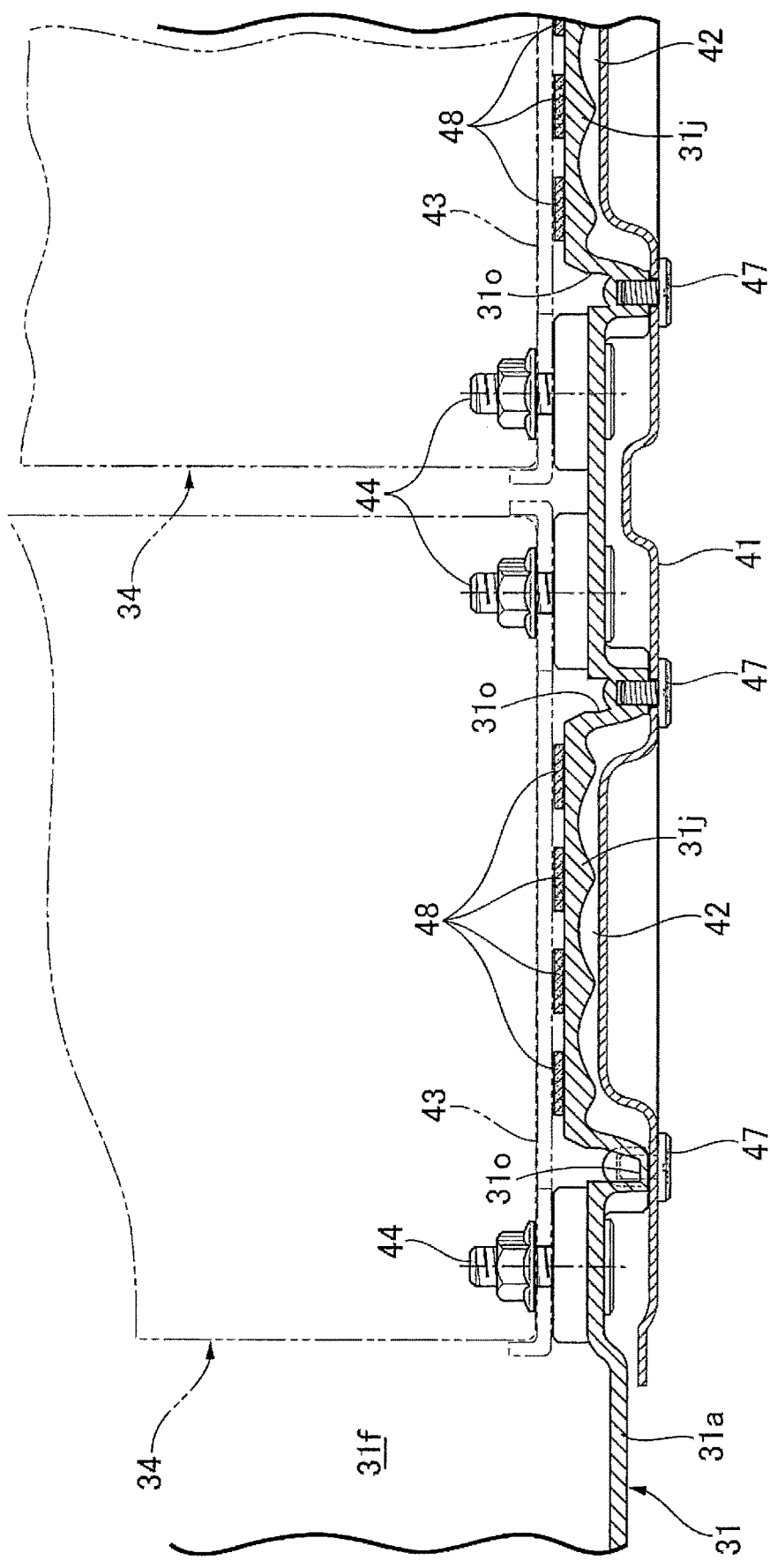
FIG. 6 is a sectional view along line 6-6 in FIG. 4.

As shown in FIG. 5, electrical power lines 38 extending from the respective battery modules 34 are bundled together, and the electrical power line 38 passes between the left and right battery modules 34 disposed on opposite sides of the vehicle body center line L and is connected to an electrical component 35 (junction board) disposed above the battery module 34. Two connecting wires 40 extending from the front and rear ground fault detection connectors 37 are bundled with the electrical power line 38 and are connected to the electrical component 35 (battery control means).

As shown in FIG. 4 to FIG. 7, a zig-zag shaped water jacket upper wall 31j recessed upward is formed on the case bottom wall 31a of the case main body 31, a cooling water supply port 31k is formed at the front end of the water jacket upper wall 31j, a cooling water discharge port 31m is formed at the rear end of the water jacket upper wall 31j, and three communication portions 31n are formed at opposite ends in the vehicle width direction of the recess portion 31h (see FIG. 4). Fixing a lid member 41 to a lower face of the case bottom wall 31a by means of a plurality of bolts 47 forms four rows of water jackets 42 extending in the vehicle width direction between a lower face of the water jacket upper wall 31j and an upper face of the lid member 41. The drain hole 31i is formed at a position where the drain hole 31i does not overlap the water jacket 42 when viewed in the up-down direction.

A lower plate 43 forming a bottom wall of each battery module 34 is mounted via a heat conductive member 48 on an upper face of the water jacket upper wall 31j of the case main body 31 defining the water jacket 42, and four corners thereof are fixed by means of four bolts 44. A front edge part and a rear edge part of the water jacket upper wall 31j forming the edge of each water jacket 42 are formed as a thick part, and an intermittent groove portion 31o extending with a downward inclination in the vehicle width direction toward the recess portion 31h of the case bottom wall 31a is formed in an upper face of the thick part.

As shown in FIG. 1 and FIG. 2, the battery case 20 thus formed is fastened to a lower face of the floor cross member 16 by means of two bolts 45 extending from bottom to top through a middle part thereof in a state in which a recess portion 32a formed in the cover 32 and extending in the vehicle width direction is fitted onto the floor cross member 16 from below, and is fastened to a lower face of the floor frame 15 by means of two bolts 46 extending from bottom to top through each of left and right side parts thereof.

The operation of the embodiment of the present invention having the above arrangement is now explained.

When water enters the interior of the battery case 18, since the case bottom wall 31a of the case main body 31 is inclined downward in going from the outside in the vehicle width direction to the middle in the vehicle width direction, the water is gathered along the inclination to the recess portion 31h in the middle part in the vehicle width direction of the case main body 31 and is detected by the ground fault detection connector 37, and an alarm is issued to notify the occurrence of a ground fault. As a result, the drain bolt 36 of the case main body 31 is detached, the drain hole 31i is opened, and water that has built up can be quickly discharged to the outside of the case main body 31.

Since the case main body 31 is made by metal die-casting, the downward inclination of the case bottom wall 31a of the case main body 31 can be easily molded at the time of die casting without increasing the number of components. Furthermore, in order to enhance the side collision resistance performance, the cross member 31e extending in the vehicle width direction is formed on the case main body 31; since the interior of the case main body 31 is divided into the front battery chamber 31f and the rear battery chamber 31g, if only one battery chamber among the front battery chamber 31f and the rear battery chamber 31g were to be provided with the ground fault detection connector 37, there is a possibility that the entry of water into the other battery chamber would not be detected, but in accordance with the present embodiment, due to the ground fault detection connector 37 and the drain hole 31i being provided in both the front battery chamber 31f and the rear battery chamber 31g, the detection of water and the discharge of water can be reliably carried out.

In this arrangement, since the intermittent groove portion 31o extending in the vehicle width direction so as to follow the upper face of the thick part at the front and rear edges of the water jacket 42 is formed in the upper face of the case bottom wall 31a of the case main body 31, it is possible to efficiently guide water that has built up on the case bottom wall 31a along the groove portion 31o to the drain hole 31i formed in the recess portion 31h in the middle in the vehicle width direction.

Furthermore, since the cross member 31e extends in the vehicle width direction, and the ground fault detection connector 37 and the drain hole 31i are disposed in the middle part in the vehicle width direction of the case main body 31, water that has built up on the upper face of the case bottom wall 31a of the case main body 31 can be gathered in the recess portion 31h via the shortest distance, water can be detected more reliably, and water can be discharged more smoothly.

Moreover, since the water jacket 42 is provided on the bottom part of the case main body 31, if an attempt were to be made to provide the downwardly extending drain hole 31i above the water jacket 42, there is a possibility that the drain hole 31i would interfere with the water jacket 42. However, in accordance with the present embodiment, since the drain hole 31i is disposed at a position where it does not overlap the water jacket 42 when viewed from above, the drain hole 31i can be easily formed without interfering with the water jacket 42.

Furthermore, since the electrical power line 38 extending from the plurality of battery modules 34 is disposed in the fore-and-aft direction in the space formed between the left and right battery modules 34 in the middle part in the vehicle width direction of the battery case 18, and the connecting wire 40 connecting the ground fault detection connector 37 to the electrical component 35 is bundled with the electrical power line 38 in the space, it is possible to dispose the electrical power line 38 and the connecting wire 40 in a compact manner by utilizing effectively the space between the left and right battery modules 34.

An embodiment of the present invention is explained above, but the present invention may be modified in a variety of ways as long as the modifications do not depart from the gist of the present invention.

For example, in the embodiment the ground fault detection connector 37 is utilized as the water detection device, but a water detection device exclusively used therefor may be provided.

Furthermore, in the embodiment the entire upper face of the case bottom wall 31*a* is inclined downward in going toward the drain hole 31*i* or the recess portion 31*h*, but only part, around the drain hole 31*i* or the recess portion 31*h*, of the upper face of the case bottom wall 31*a* may be inclined downward.

What is claimed is:

1. A battery pack of an electric vehicle comprising a plurality of battery modules housed in an interior of a battery case made by metal die-casting,
    wherein the battery case comprises a drain hole for discharging water in its interior to an outside and a water detection device disposed in a vicinity of the drain hole, and
    at least part of an upper face of a case bottom wall of the battery case is inclined downward in going toward the drain hole,
    a recess portion is formed on the lowest position of the case bottom wall of the battery case and the drain hole is formed in a lower part, facing the recess portion, of a wall of the battery case extending in an up-and-down direction.

2. A battery pack of an electric vehicle comprising a plurality of battery modules housed in an interior of a battery case made by metal die-casting,
    wherein the battery case comprises a drain hole for discharging water in its interior to an outside and a water detection device disposed in a vicinity of the drain hole,
    a downwardly recessed recess portion is formed on a lowest position in an upper face of a case bottom wall of the battery case, and
    the drain hole is formed in a lower part, facing the recess portion, of a wall of the battery case extending in an up-and-down direction.

3. The battery pack of an electric vehicle according to claim 1, wherein
    the interior of the battery case is divided into two battery chambers by a beam portion formed integrally with the battery case, and
    the drain hole and the water detection device are provided in each of the battery chambers.

4. The battery pack of an electric vehicle according to claim 3, wherein
    the beam portion extends in a vehicle width direction, and
    the drain hole and the water detection device are disposed in a middle part in the vehicle width direction of the battery case.

5. The battery pack of an electric vehicle according to claim 1, wherein
    the battery case comprises a water jacket formed between the battery case and a lid member fixed to a lower face of the case bottom wall, and
    the drain hole is disposed at a position where the drain hole does not overlap the water jacket when viewed from above.

6. The battery pack of an electric vehicle according to claim 5, wherein
    the battery case comprises a groove portion formed in an upper face of the case bottom wall, the groove portion being recessed downward along part of a periphery of the water jacket, and
    the groove portion extends toward the drain hole.

7. The battery pack of an electric vehicle according to claim 1, wherein
    an electrical power line extending from the plurality of battery modules is disposed in a fore-and-aft direction in a space formed between the battery modules on left and right in the middle part in the vehicle width direction of the battery case, and
    a connecting wire connecting the water detection device to an electrical component is bundled with the electrical power line in the space.

* * * * *